No. 847,074. PATENTED MAR. 12, 1907.
J. W. HURD.
HAY RAKE.
APPLICATION FILED OCT. 11, 1906.
2 SHEETS—SHEET 1.
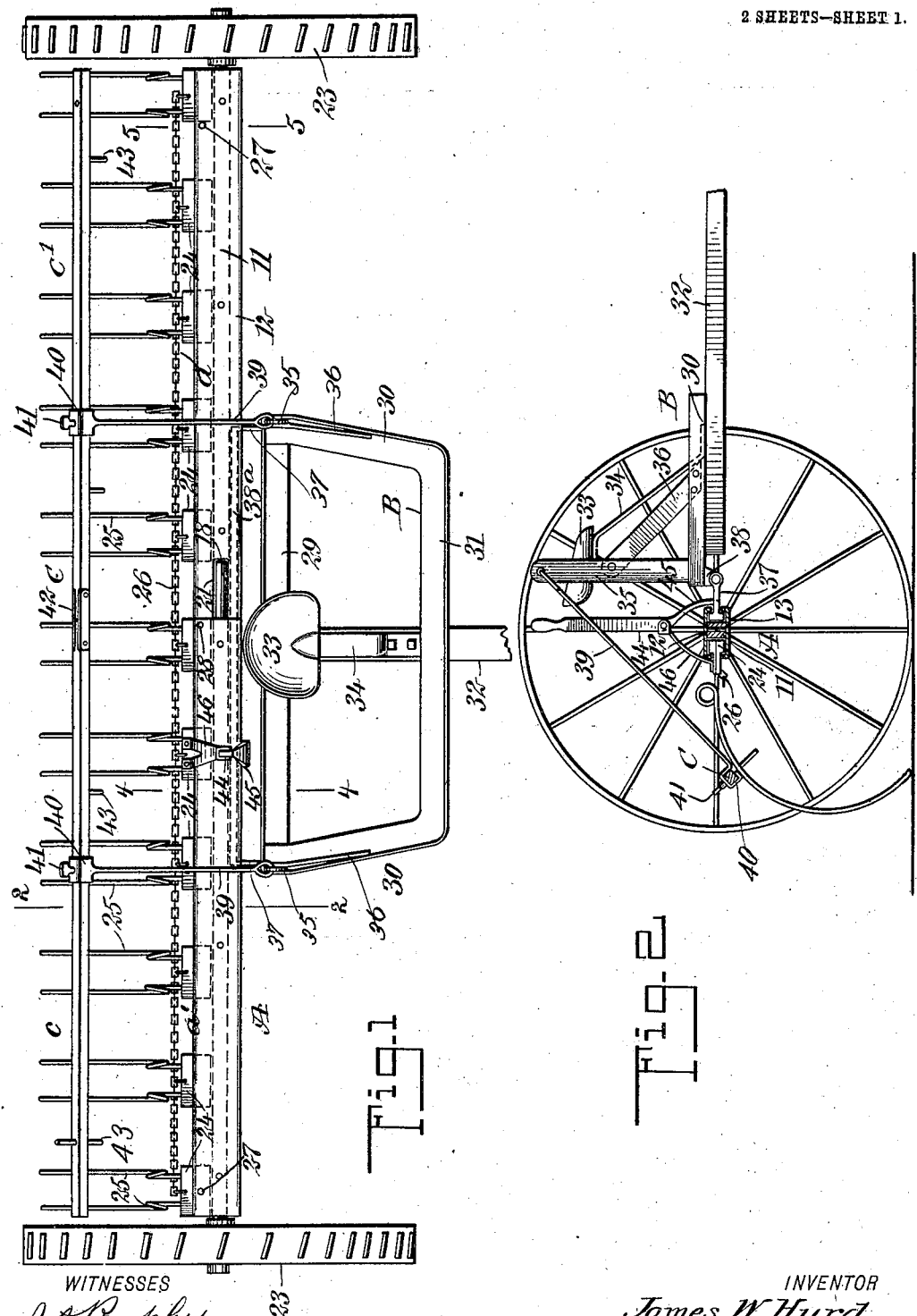
WITNESSES
INVENTOR
James W. Hurd
BY
ATTORNEYS No. 847,074. PATENTED MAR. 12, 1907.
J. W. HURD.
HAY RAKE.
APPLICATION FILED OCT. 11, 1906.
2 SHEETS—SHEET 2.
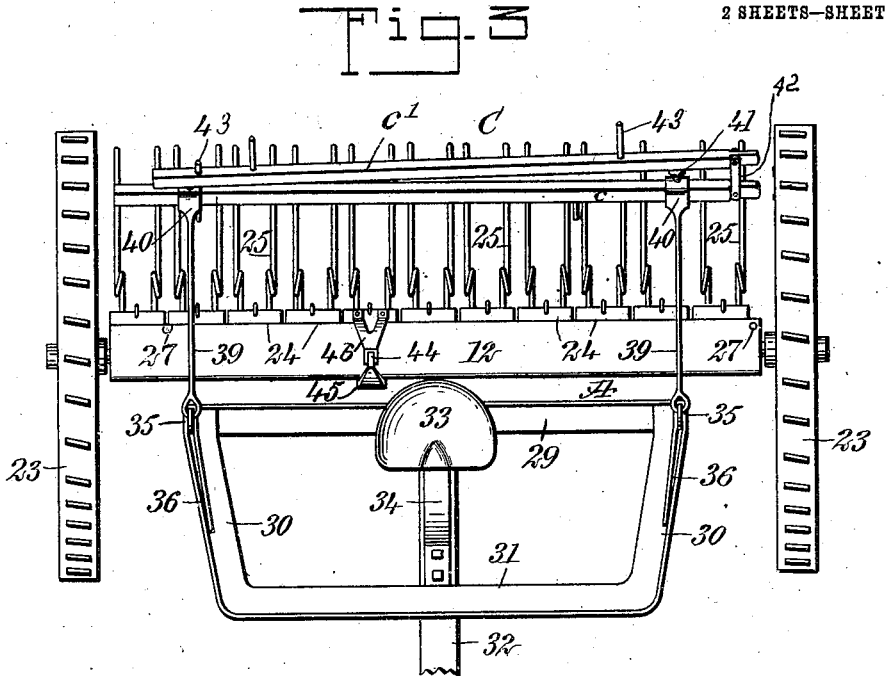
Fig. 3
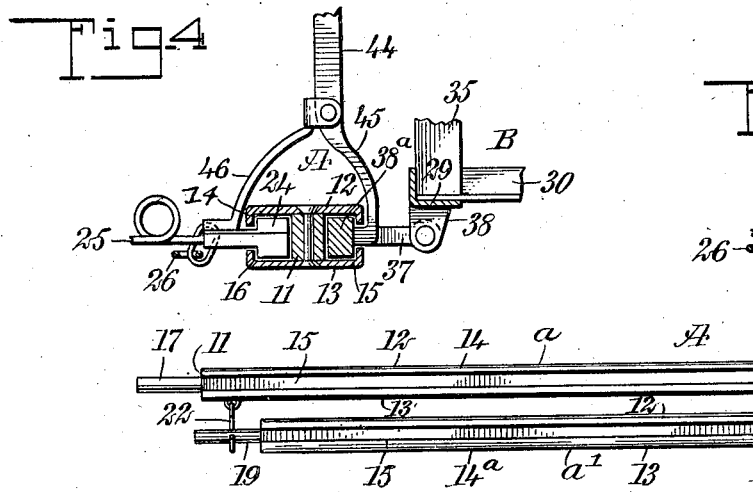
Fig. 4
Fig. 5
Fig. 6
WITNESSES
INVENTOR
James W. Hurd
BY Munn & Co
ATTORNEYS

UNITED STATES PATENT OFFICE.

JAMES WESLEY HURD, OF DONA, VIRGINIA.

HAY-RAKE.

No. 847,074.          Specification of Letters Patent.          Patented March 12, 1907.

Application filed October 11, 1906. Serial No. 338,451.

*To all whom it may concern:*

Be it known that I, JAMES WESLEY HURD, a citizen of the United States, and a resident of Dona, in the county of Lee and State of Virginia, have invented a new and Improved Hay-Rake, of which the following is a full, clear, and exact description.

The purpose of the invention is to provide a folding horse hay-rake of simple, durable, and economic construction whereby the rake can be made long or short, as desired, and be equally effective under either adjustment.

Another purpose of the invention is to provide a construction for a folding horse hay-rake wherein the various parts are not disconnected when effecting the adjustment, thereby preventing the loss of the adjustable parts.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved rake adjusted to full length. Fig. 2 is a vertical transverse section taken practically on the line 2 2 of Fig. 1. Fig. 3 is a plan view of the rake adjusted to its shorter length. Fig. 4 is a detail transverse section taken practically on the line 4 4 of Fig. 1. Fig. 5 is a detail section taken substantially on the line 5 5 of Fig. 1, and Fig. 6 is a side elevation of the axle of the rake folded.

The axle A is constructed in two sections, a right-hand section $a$ and a left-hand section $a'$, said right-hand section being preferably longer than the left-hand section, as is shown in Fig. 6, and said sections are connected by a hinge 10 in such manner that the left-hand section $a'$ may be folded beneath and parallel with the right-hand section $a$, as is also shown in Fig. 6.

In the detail construction of the axle A it consists of a body-bar 11 and top and bottom plates 12 and 13, which extend beyond the front and rear sides of the body-bar, as is particularly shown in Figs. 4 and 5, and the upper plate at each of its longitudinal edges is provided with a downwardly-extending flange 14, while the lower plate is provided with corresponding upwardly-extending flanges 14$^a$, as is also shown in Figs. 4 and 5. In this manner a front channel or chamber 15 is provided and a rear and parallel chamber 16, which chambers are open at both of their ends and for a portion of their outer faces. The right-hand section $a$ of the axle A is provided with a spindle 17 at its outer end and with a second spindle 18 at its inner end, while the left-hand section $a'$ of the axle is provided with a spindle 19 at its outer end and a longitudinal recess 20 at its inner end, located between the top and bottom surfaces of said section, as shown in Fig. 6. Further, said left-hand section $a'$ of the axle is provided with a longitudinal slot 21 in its upper face at its inner end, which slot connects with said recess 20, as is shown in Fig. 1. When the two sections of the axle are brought end to end, they abut closely at their opposing end surfaces, and the spindle 18 of the section $a$ will pass through the slot 21 in the section $a'$ and enter the recess 20, as is also shown in Fig. 1. At such time the supporting-wheels 23 are located on the spindles 17 and 19. When, however, it is desired to shorten the machine, the left-hand section $a'$ of the axle A is folded beneath the right-hand section $a$, as shown in Fig. 6, and said two sections are held in this position by means of a hook 22, carried by the section $a$, for example, as is also shown in Fig. 6. When the axle is so adjusted, the left-hand supporting-wheel 23 is made to turn on the inner spindle 18 of the right-hand section $a$ of the axle.

A series of substantially T-shaped tooth-carrying blocks 24 is slidably mounted at the rear of the axle A, the head members of said T-blocks being made to slide in the rear channel or chamber 16 of the axle, while the shank members of said tooth-carrying blocks extend out a suitable distance through the opening in the rear wall of said channel 16. Two rake-teeth 25, of any approved construction, are secured in any approved manner to the shank member of each tooth-carrying block 24; but I desire it to be understood that the blocks 24 may be made of sufficient size to receive one, three, or more teeth.

When the axle A is adjusted to its shorter length, as shown in Fig. 3, the tooth-carrying blocks 24 practically abut and are all contained in the channel 16 of the right-hand section $a$ of the axle, as shown in Fig. 3;

but when the axle A is adjusted to its full length, as illustrated in Fig. 1, the tooth-carrying blocks 24 are spaced an equal distance apart and extend from end to end of both of the sections $a$ and $a'$ of the axle. The tooth-carrying blocks 24 at such time are limited in their spacing movement by means of chains 26, which are connected with the several blocks 24, the chains between opposing blocks being of the same length.

When the axle is adjusted to its full length and the chain 26 has been properly stretched, as is shown in Fig. 1, the end tooth-carrying blocks 24 are held in set position by means of a pin 27 passing through the block at the right-hand end of the section and a pin 27 engaging the inner side face of the block at the left-hand end of the section, which pins are passed through the rear portions of the axle-plates 12 and 13, as shown in Figs. 1 and 5. When, however, the axle is adjusted to its shorter length, as is shown in Fig. 3, the left-hand pin 27 is passed down through a suitable aperture 28, made in the inner end portion of the right-hand section $a$ of the axle.

In connection with the axle A and parts carried thereby a draft-frame B is employed, adjustably connected with the forward portion of said axle A. This draft-frame, as is shown in Figs. 1 and 3, is substantially rectangular, although it may be given any desired shape, and, as is illustrated, is constructed of angle-iron and consists of a rear member 29 parallel with the axle, forwardly and inwardly inclined side members 30, and a front member 31. The tongue or pole 32 is secured to the central portion of said draft-frame B, and the driver's seat 33 is supported from said tongue or pole 32 at the frame B by means of a suitable spring-standard 34.

An upright 35 extends from each side of the rear portion of the draft-frame B, the said uprights being usually strengthened by means of braces 36. (Shown best in Fig. 2.) A T-bar 37 is pivoted at its forward end at each side of the rear portion of the draft-frame B, the pivotal attachment being made to lugs 38, which extend down from the frame, as is shown in Fig. 2, and the head members of these hinged or pivoted T-bars 37 are adapted to slide in the forward axle-channel 15, and the said head members of said T-bars 37 are united by a connecting-bar 38ª, which also slides in the said forward axle-channel 15, as indicated by dotted lines in Fig. 1. It will thus be observed that the draft-frame B may be shifted to any desired point in the axle A. When the said axle is out full length, the draft-frame B is at each side of the hinge connection between the sections of the axle, as shown in Fig. 1, thus holding said sections in said adjusted position. When, however, the axle is used in its shortened length, as is shown in Fig. 3, the draft-frame B is slid along the axle until it is at the central portion of the right-hand section $a$ of the axle, as is also shown in Fig. 3.

Each standard 35 has pivoted to its upper end an arm 39, and these arms normally extend downward and rearward and terminate in sleeves 40, provided with set-screws 41. The sleeves 40 of the arms 39 loosely receive the members $c$ and $c'$ of a cleaning or discharge bar C, the sections whereof correspond in length preferably to that of the sections of the axle A, and the sections of the cleaning-bar have a hinge connection, which hinge preferably consists of parallel links 42, as shown in Fig. 1. From the members of said cleaning-bar C pins 43 extend, so that when the rake-teeth are carried up to dumping position the pins on the cleaning-bar will tend to free the teeth from any hay having a tendency to cling thereto. By tightening up the set-screws 41 the cleaning-bar C is held in suitable position relatively to the draft-frame B.

The rake may be dumped in any approved manner—namely, by rocking the axle A in an upward and forward direction. This is usually accomplished through the medium of a lever 44, which is at the right-hand side of the driver's seat 33, convenient thereto. The lower end of said lever is bifurcated, its forward member 45 being secured to a sliding bar 38ª, connected with the draft-frame B, and the rear member 46 is connected with the most convenient tooth-carrying block 24.

It will be observed that the construction shown and described is very simple and not liable to get out of order and that the rake can be made long or short at almost a moment's notice and without absolutely removing any part of the machine with the exception of one supporting-wheel, which is a part not liable to be lost or mislaid.

It is obvious that when a hay-rake is constructed to fold, as presented in the drawings and specifications, the said rake may be adapted for effective service where other rakes could not be satisfactorily employed and that in going to and from the field the rake may be so shortened as to travel conveniently along a comparatively crowded road, and, furthermore, the rake in its shorter adjustment is enabled to be passed through small openings and then quickly spread out to its full length for service in that position when required.

The implement can be drawn by either a single horse or a team. Therefore a pole or shaft can be used, and with such end in view the lugs 38 may be made larger and the ends of the T-bars 37 shorter in order to pivot close to the axle, if required.

Having thus described my invention, I claim as new and desire to secure by Letters Patent—

1. In a hay-rake an axle comprising a plurality of sections, means whereby said sections may be folded into parallelism with each other, and means for retaining them in alinement or in folded position.

2. In a hay-rake an axle comprising a plurality of sections, means whereby said sections may be folded into parallelism with each other, spindles on the outer ends of the sections, and a spindle on the inner end of one of the sections.

3. In a hay-rake, a folding axle, tooth-carrying elements slidable upon the axle, and means for locking the axle in extended position and for holding the same in shortened position.

4. In a horse hay-rake, an axle constructed in hinged sections, one section having a spindle at each end and the other section a spindle at its outer end, and a recess at its inner end wherein to receive the inner spindle of the opposing axle-section, means for locking the sections in extended position, and devices for holding said sections in shortened position.

5. In a hay-rake, an axle constructed in hinged sections, which axle is provided with outer spindles and an intermediate spindle, a series of teeth-carrying elements slidably mounted upon the axle, means for limiting the relative movement of said elements, devices for locking said elements in adjusted position, and a draft-frame having sliding connection with the axle and serving as a lock for the sections of the axle when the latter is at full length for service.

6. In a hay-rake, an axle constructed in hinged sections, which axle is provided with outer spindles and an intermediate spindle, a series of teeth-carrying elements slidably mounted upon the axle, means for limiting the relative movement of said elements, devices for locking said elements in adjusted position, a draft-frame having sliding and hinged connection with the axle, a cleaning-bar for the rake-teeth, pivotally connected with the draft-frame, and means for rocking said axle.

7. In a horse hay-rake, the combination with an axle constructed in two hinge-connected sections, each section being provided with a channel at the front and at the rear, said channels being partially opened at their outer side portions, one of the said sections of the axle being provided with a spindle at each end, and the other section with a spindle at its outer end and with a recess at its inner end to receive the inner spindle of the opposing axle-section, and supporting-wheels for the axle, of a series of blocks held to slide in the rear channels of the axle-sections, rake-teeth secured to said blocks, flexible connections between the blocks, means for locking the blocks in adjusted position upon the axle, a draft-frame, arms pivotally connected to said frame, having head-sections adapted to slide in the forward axle-channel, and a connecting-bar uniting the heads of the said pivoted bars of the frame, which connecting-bar likewise has sliding movement in the said forward axle-channel, whereby when the axle is adjusted to full length and the draft-frame is made to extend out at each side of the hinge connection between the sections of the axle the connecting-bar of the said frame will serve to lock the sections in their extended position.

In testimony whereof I have signed my name to this specification in the presence of two subscribing witnesses.

JAMES WESLEY HURD.

Witnesses:
FLOYD ROBINSON,
HAMPTON WILLIS.